United States Patent [19]
Hope

[11] 4,079,629
[45] Mar. 21, 1978

[54] OIL TO GASOLINE RATIO MEASURING DEVICE

[76] Inventor: Howard Hope, 3721 Highland, White Bear Lake, Minn. 55110

[21] Appl. No.: 661,492

[22] Filed: Feb. 25, 1976

[51] Int. Cl.² .............................................. G01F 19/00
[52] U.S. Cl. ..................................................... 73/427
[58] Field of Search ........................ 73/427, 426, 429; 215/365, 366, 6; D7/50; D52/1; 222/23, 29, 157, 158; 206/219

[56] References Cited
U.S. PATENT DOCUMENTS

| | | | |
|---|---|---|---|
| D. 188,216 | 6/1960 | Dow | D52/1 |
| D. 193,798 | 10/1962 | Tahaney | D7/50 |
| D. 230,688 | 3/1974 | Cryer | 73/426 X |
| D. 232,527 | 8/1974 | Sears | D7/50 X |
| 3,530,722 | 9/1970 | Miller | 73/427 |
| 3,948,105 | 4/1976 | Johnson, Jr. | 73/427 |

*Primary Examiner*—Richard C. Queisser
*Assistant Examiner*—Joseph W. Roskos
*Attorney, Agent, or Firm*—Richard Francis

[57] ABSTRACT

Various two cycle engines require different gasoline to oil ratios for proper operation of the engine. These ratios may vary as much as from 15 to 1 to 50 to 1 or possible even greater. Usually the gasoline used is contained in one to two one-half gallon cans. This makes it difficult to provide the particular ratio of oil to gasoline in the can. The present measuring device is provided to eliminate this difficulty.

4 Claims, 4 Drawing Figures

OIL TO GASOLINE RATIO MEASURING DEVICE

This invention relates to a measuring device which is calibrated to indicate the amount of oil to be used with each unit of gasoline to provide the desired mixture such as 50 to 1 ratio including one part of oil to 50 parts of gasoline to a 21 to 1 ratio in which 25 parts of gasoline are used to 1 part of gasoline. The measuring device is preferably transparent or translucent so the depth of oil in the measuring cup may be readily seen.

DESCRIPTION OF THE PRIOR ART

Nothing has been found to accomplish a similar result. Obviously, measuring cups have been produced to measure out a predetermined amount of liquid. However, the measurement of fluid depends upon the gasoline to oil ratio and accordingly the device is considered novel.

SUMMARY OF THE INVENTION

A measuring device is provided including a plurality of depth indications showing the depth of oil to which the measuring device is filled depending upon the oil to gasoline ratio in a particular engine. Obviously, if an engine requires a 50 to 1 ratio of oil to gasoline, much less oil is required for each gallon of gasoline used, than if the engine requires a 30 to 1 ratio. The present device is designed to provide a visually noticeable indication of the proper amount of oil to use with the gasoline so as to produce the proper oil to gasoline ratio.

Modern two cycle gasoline engines require oil to gasoline mixtures of varying ratios. This is a measurement receptacle designed to facilitate the measuring of the proper amount of oil to be mixed with a United States gallon or half-gallon of gasoline used in other countries. These ratios are available from the companies producing the engines. The measurement is provided by a series of lines extending from the bottom of the container, which is normally transparent or translucent, and each line is provided with proper gradations for the amounts of oil to be mixed with a gallon or half-gallon of gasoline, or with containers from different countries. As a result the owner or operator of the motor may put in the proper amount of oil depending upon the gasoline to oil ratio so that the proper proportion of oil may be readily observed.

In other words, by pouring a predetermined amount of oil into the measurement device, the operator of the engine is assured that the proper amount is added for each gallon of gasoline. In this country, gasoline is often provided in two and one-half gallon cans. The operator of a lawn mower, snow blower or the like, usually pour a predetermined amount of oil into the gasoline can, before it is filled. When filled, the proper ratio of oil to gasoline is insured.

The applicant discloses two means of accomplishing the desired result. The first lies in a cup-like container which is provided with lines extending from the bottom of the container to a certain area which is designated on the receptacle. On the reverse side of the oil receptacle is normally provided similar ratios which describe the amount of oil which should be added to perhaps five liters of gasoline or one Imperial gallon of gasoline. These are usually identical. By filling the receptacle with oil to the desired level according to the indicia on the receptacle, the proper amount of oil will be added to the gasoline.

While the receptacle described is the preferred form of the invention, due to its simplicity, a series of measuring glasses may be provided in nesting arrangement so that one will fit within the other. By choosing the proper receptacle a measured amount of oil may be added to the gasoline according to the engine requirements.

These and other objects and novel features of the present invention will be clearly set forth in the following specification and claims.

DESCRIPTION OF THE PREFERRED EMBODIMENTS

Figure 1:
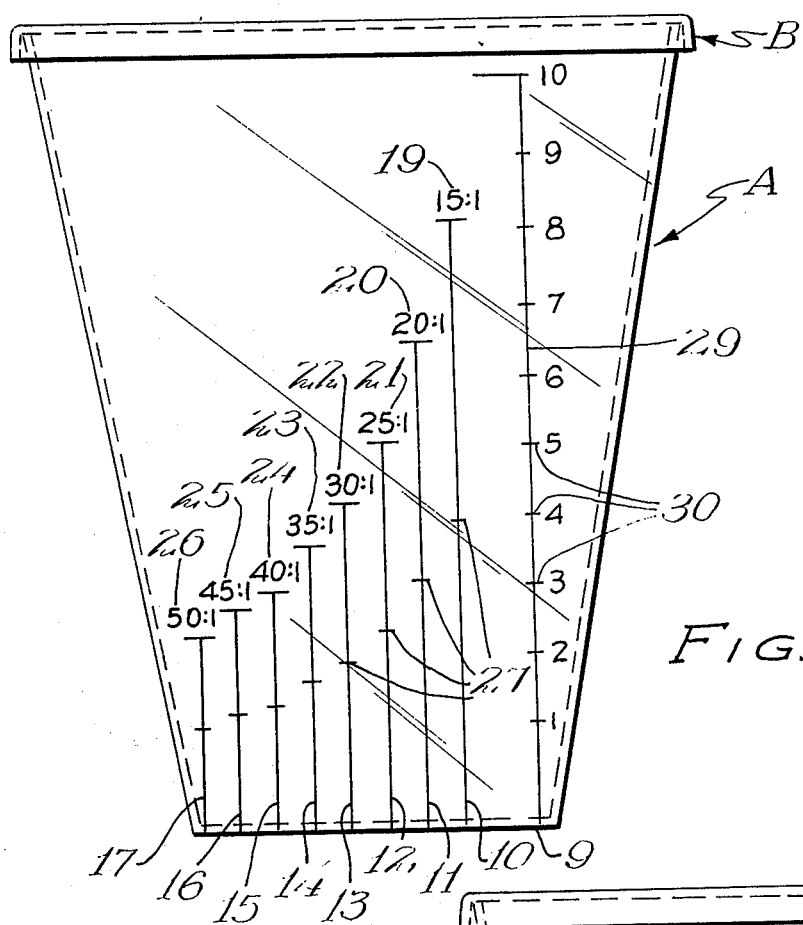
FIG. 1 discloses a measurement receptacle showing the amounts of oil which should be added to each gallon of gasoline to produce the proper mixture.
Figure 2:
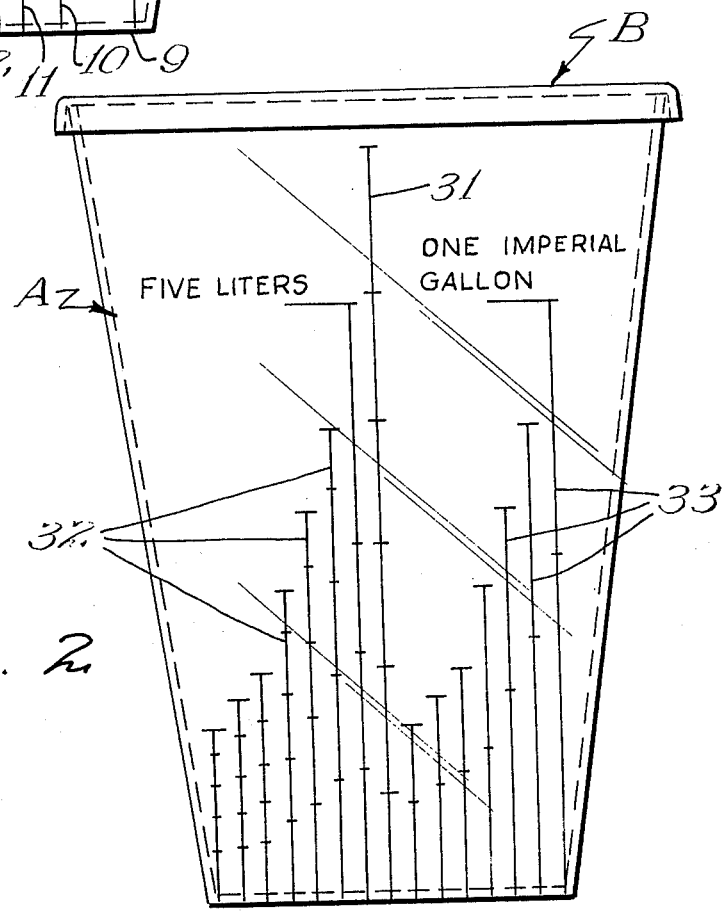
FIG. 2 may be the reverse side of the receptacle shown in FIG. 1 showing the amount of oil to be added to five liters of gasoline, and the amount of oil to be added to one Imperial gallon or gasoline to the proper mixture.

A popular form of my measuring cups is indicated at A in FIGS. 1 and 2 of the drawings. As indicated, one side of the cups is provided with lines extending upwardly from the bottom 9 of the cup. These lines identified as 10, 11, 12, 13, 14, 15, 16 and 17 extend varying distances from the bottom 9. For example, when the cup is filled with oil to the top of line 10, a short cross mark is provided at the point where the oil level will indicate a 15 to 1 ratio when mixed with a standard United States gallon of gasoline. This ratio is indicated by the numeral 19. Similar oil to gasoline ratios are provided at the upper ends of the lines 11 through 17 inclusive and are indicated by the numerals 20 through 26 inclusive. The indicia 26 indicates the lowest oil to gasoline ratio normally used in two cycle engines, which is 1 to 50. The line 29 indicates a measuring scale for United States fluid ounces so the cup may also be used for measuring out a predetermined number of ounces of oil or another liquid.

As indicated in FIG. 1, gauge marks 27 are provided in each of the lines 27 through 17 to indicate a certain proportion of the total oil indicated by the lines 10 through 17. These gauge marks are indicated at one-half the height of each of the lines so that an amount of oil to be added to each half-gallon of gasoline may be measured.

FIG. 2 of the drawings shows the rear side of the cup shown in FIG. 1. As will be noted, the indicia indicates that the side relates to Imperial gallons of gasoline, such as are provided in Canada and other countries and liters as are common in other countries. The center line 31 shows a scale having designations to show the total amount of oil in the cup while opposite sides of the center line indicate the level of liters and and Imperial gallons. In view of the fact that the Imperial gallons are normally based on five liters, the gauge marks are substantially aligned. Vertical lines are indicated by the numerals 32 and 33, and function similarly to the previous described 11 through 17 lines.

Figure 3:
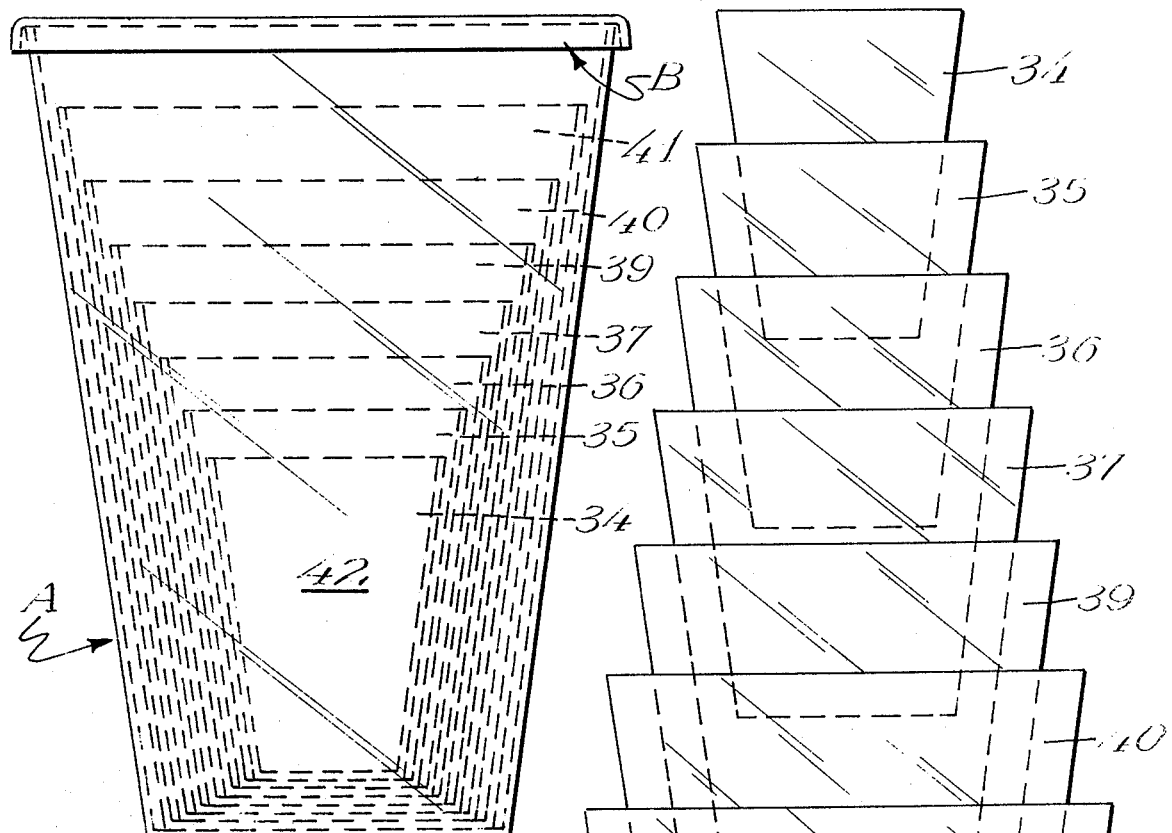
FIG. 3 indicates a series of measuring cups in nesting relation.
Figure 4:
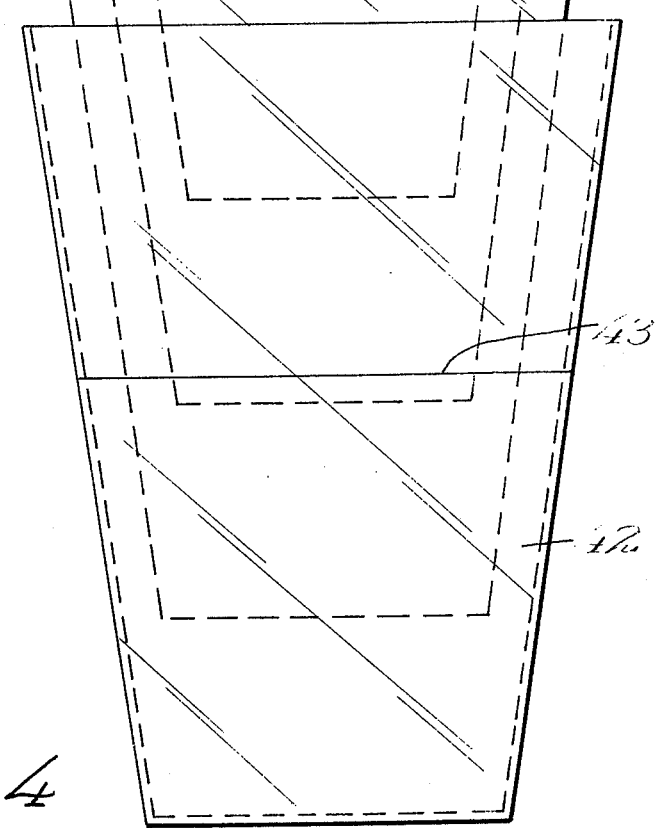
FIG. 4 is an exposed view showing the measuring cups of FIG. 3 in overlapped relation.

A variation in this type of measuring cup is shown in FIGS. 3 and 4 of the drawings. As shown in these figures, a separate measuring cup is provided for each ratio of oil to gasoline. The cups 34, 35, 36, 37, 39, 40, 41 and 42 represent the amount of oil to be combined with the gasoline depending upon the ratio described by the manufacturer of the engine. As for example, the cup 34 indicates the amount of oil to be added to a gallon of gasoline to provide a 50 to 1 ratio. The cup 41 when filled with oil indicates the amount of oil to be added to one gallon of gasoline to provide a 15 to 1 ratio. Thus, in either case, the markings described are important where different measurements of gasoline relative to the added oil are used. These measurements are provided to facilitate any unusual or intermediate measurements. Since the ounces of milimeters so measured will be of oil, with its different specific gravity as opposed to water, the amounts so measured will be different from the ounces measured by the common household measuring cup. This column will be headed ounces of oil.

The measure would be used similar to a jigger used in preparing mixed drinks or as a measuring cup used in preparing recipes. For example, if the proper amount of oil were to be measured out and added to two and one-half gallons of gasoline at a ratio of 20 to 1, the operation would be to fill the measure two and one-half times to the graduation under the notation 20.

The measure would normally have a cover B to keep dirt and debris out, and with a cover label giving brief instructions as to its use.

In accordance with the Patent Statutes, I have described the principles of operation of my Oil to Gasoline Ratio Measuring Device, and while I have endeavored to set forth the best embodiment thereof I desire to have it understood changes may be made within the scope of the following claims without departing from the spirit of my invention.

I claim:

1. A measuring device for measuring the required quantity of oil to be mixed with a predetermined amount of gasoline to obtain a predetermined ratio of gasoline to oil, said measuring device comprising: a liquid container having continuous side wall which permits visual observation of the oil surface level therethrough and which is closed on one end with a bottom portion, open on the opposite end, and has one or more lines of predetermined length, each line extending from a point located on the line defining the intersection of said side wall with said bottom portion toward said open opposite end to a second point which indicates the level to which the container should be filled with oil, when mixed with a predetermined quantity of gasoline, will produce a mixture having a predetermined ratio of gasoline to oil which is imprinted on said container side wall adjacent said line.

2. The measuring device of claim 1 wherein each of said lines has at least one other marked point within its length to indicate the level to which the container should be filled with oil which, when mixed with a second predetermined volume of gasoline smaller than that predetermined volume of gasoline stated in claim 1, will produce a mixture having said predetermined ratio of gasoline to oil which is imprinted on said container side wall adjacent said line.

3. The measuring device of claim 2 wherein said second point is located at a point between the ends of said line which indicates the level to which the container should be filled to provide a volume of oil which is one-half the volume of oil indicated by said second point.

4. The measuring device of claim 1 further including a cover over the open end of said container to exclude dust and debris.

* * * * *